United States Patent
Han et al.

(10) Patent No.: US 10,721,500 B2
(45) Date of Patent: Jul. 21, 2020

(54) SYSTEMS AND METHODS FOR LIVE MULTIMEDIA INFORMATION COLLECTION, PRESENTATION, AND STANDARDIZATION

(71) Applicant: Beijing Xiaomi Mobile Software Co., Ltd., Haidian District, Beijing (CN)

(72) Inventors: Shangyou Han, Beijing (CN); Chao Sun, Beijing (CN); Zegao Yu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 302 days.

(21) Appl. No.: 15/787,303

(22) Filed: Oct. 18, 2017

(65) Prior Publication Data

US 2018/0124435 A1    May 3, 2018

Related U.S. Application Data

(63) Continuation of application No. PCT/CN2016/104098, filed on Oct. 31, 2016.

(51) Int. Cl.
*H04N 7/18* (2006.01)
*H04N 21/222* (2011.01)
(Continued)

(52) U.S. Cl.
CPC ....... *H04N 21/222* (2013.01); *H04L 65/4015* (2013.01); *H04L 65/4038* (2013.01);
(Continued)

(58) Field of Classification Search
CPC .... H04N 21/24; H04N 21/442; H04N 21/812; H04N 21/222; H04N 21/2343;
(Continued)

(56) References Cited

U.S. PATENT DOCUMENTS

| 8,581,957 B2 | 11/2013 | Bengtsson et al. |
| 9,462,249 B2 | 10/2016 | Goldberg |

(Continued)

FOREIGN PATENT DOCUMENTS

| CN | 101400039 A | 4/2009 |
| CN | 103873888 A | 6/2014 |

(Continued)

OTHER PUBLICATIONS

Office Action in Korean Application No. 10-2018-7022393, dated Aug. 1, 2019 with English translation (14p).

(Continued)

*Primary Examiner* — Michael H Hong
(74) *Attorney, Agent, or Firm* — Arch & Lake LLP

(57) ABSTRACT

The present disclosure relates to presentation of live multimedia information via a live multimedia information system that includes a collecting device, and a standardization server. A live instruction sent by a live terminal is received; ambient information is recorded and multimedia information is obtained using the collecting device; the multimedia information, which may include audiovisual information to be presented in real time to remote viewers, is sent to the standardization server according to the live instruction, which may identify a destination for the multimedia information. The standardization server may send the multimedia information, which may be optimized for one or more playing terminals, to a playing terminal, and the playing terminal may receive and play the multimedia information for a remote audience. Playback quality is improved for live multimedia information.

18 Claims, 10 Drawing Sheets

(51) Int. Cl.
*H04L 29/06* (2006.01)
*H04N 21/2187* (2011.01)
*H04N 21/2343* (2011.01)

(52) U.S. Cl.
CPC ...... *H04L 65/4084* (2013.01); *H04L 65/4092* (2013.01); *H04L 65/608* (2013.01); *H04L 65/80* (2013.01); *H04N 21/2187* (2013.01); *H04N 21/2343* (2013.01); *H04N 7/18* (2013.01)

(58) Field of Classification Search
CPC ......... H04N 21/2347; H04N 21/42209; H04N 21/4884; H04N 21/4263; H04N 21/6125; H04N 21/2187; H04N 7/18
USPC ..... 725/116, 131, 89, 34, 46, 14, 19, 92, 30, 725/24
See application file for complete search history.

(56) References Cited

U.S. PATENT DOCUMENTS

| | | |
|---|---|---|
| 2008/0291260 A1 | 11/2008 | Dignan et al. |
| 2011/0280540 A1 | 11/2011 | Woodman |
| 2012/0064879 A1 | 3/2012 | Panei |
| 2012/0265892 A1 | 10/2012 | Ma et al. |
| 2013/0265378 A1 | 10/2013 | Abuan et al. |
| 2014/0137162 A1 | 5/2014 | McNamee et al. |
| 2016/0255531 A1* | 9/2016 | Stein ................ G06F 1/1632 455/575.1 |
| 2017/0347133 A1* | 11/2017 | Wang ................ H04W 4/70 |

FOREIGN PATENT DOCUMENTS

| | | |
|---|---|---|
| CN | 105681855 A | 6/2016 |
| CN | 105828091 A | 8/2016 |
| CN | 105939480 A | 9/2016 |
| CN | 106664432 A | 5/2017 |
| EP | 2985980 A1 | 2/2016 |
| JP | 5317555 B2 | 2/2009 |
| JP | 2009027703 A | 2/2009 |
| JP | 2014033307 A | 2/2014 |
| JP | 2015220595 A | 12/2015 |
| JP | 2016171382 A | 9/2016 |
| KR | 20100064954 A | 6/2010 |
| RU | 2515472 C2 | 5/2014 |

OTHER PUBLICATIONS

Office Action in corresponding Russian Application No. 2018111111, dated Nov. 13, 2018, 8 pages.
Japanese Office Action (including English translation) issued in JP2017-545910, dated Jan. 8, 2019, 7 pages.
International Search Report (including English translation) and Written Opinion issued in PCT/CN2016/104098, dated Jul. 6, 2017, 7 pages.
Extended European Search Report issued in corresponding European Application No. 17189900.8, dated Feb. 16, 2018, 10 pages.
First Office Action issued to EP Application No. 17189900.8, dated Oct. 18, 2019, (7p).
First Office Action issued to Indian Application No. 201747029431, dated Jan. 13, 2020 with English translation, (6p).

* cited by examiner

SYSTEMS AND METHODS FOR LIVE MULTIMEDIA INFORMATION COLLECTION, PRESENTATION, AND STANDARDIZATION

CROSS REFERENCE TO RELATED APPLICATION

This application is based upon and claims a priority to International Patent Application Serial No. PCT/CN2016/104098, filed with the Status Intellectual Property Office of P. R. China on Oct. 31, 2016, the entire contents of which are incorporated herein by reference.

TECHNICAL FIELD

The present disclosure relates to network platforms for live multimedia information, and more particularly, to collection, presentation, and standardization of live multimedia information.

BACKGROUND

With the rapid development of network technology, there have been more and more live network platforms (i.e., network platforms for real-time or near real-time presentation of multimedia information). Various kinds of multimedia information may be presented via the live network platforms, such as videos, audio recordings, and photographs.

In the related art, a "live" mobile phone (for example, a mobile phone of an anchor or other broadcaster/presenter) may log into a server of the live network platform, then the server may send a live network address to the live mobile phone. After that, live video information may be collected (i.e., captured or recorded) using a camera of the live mobile phone, and live audio information may be collected by a microphone of the live mobile phone. Finally, the live mobile phone may send multimedia information including collected live video information and live audio information to the live network address. A "playing" mobile phone (for example, a mobile phone of an audience member who is normally not in the vicinity of the live mobile phone and is thus generally too remote to directly perceive the video and audio information being collected) may also log into the server of the network live platform, then the server may be triggered to send the multimedia information from the live network address to the playing phone, such that the playing mobile phone can receive the multimedia information and play it for the audience member.

However, the multimedia information collected by the camera or the microphone of the live mobile phone may have poor quality, and the multimedia information sent from the server to the playing mobile phone may also have poor quality, resulting in low-quality live multimedia information experiences for audiences.

SUMMARY

In one or more example embodiments, a method, implemented using a collecting device, for presentation of live multimedia information is provided. The collecting device is part of a live multimedia information system comprising a standardization server, a live terminal, a playing terminal, and the collecting device. The collecting device is configured to send multimedia information to the standardization server, and the standardization server is configured to receive multimedia information from the collecting device and send multimedia information to the playing terminal. The example method comprises: receiving, at the collecting device, a live instruction sent by the live terminal, the live instruction identifying a destination for multimedia information; recording, via the collecting device, ambient information to obtain multimedia information having audiovisual information to be presented to a remote viewer; and based on the destination identified in the live instruction, sending the multimedia information from the collecting device to the standardization server for transmission to the playing terminal, the playing terminal being configured to receive the multimedia information from the standardization server and play the multimedia information for the remote viewer.

In one or more example embodiments, a method, implemented using a standardization server, for presentation of live multimedia information is provided. The standardization server is part of a live multimedia information system comprising a collecting device, a live terminal, a playing terminal, and the standardization server. The collecting device is configured to send multimedia information to the standardization server, and the standardization server is configured to receive multimedia information from the collecting device and send multimedia information to the playing terminal. The example method comprises: receiving, at the standardization server, multimedia information sent by the collecting device, wherein the multimedia information is obtained by the collecting device by recording ambient information, the multimedia information having audiovisual information to be presented to a remote viewer, and wherein the collecting device sends the multimedia information according to a live instruction received from the live terminal, the live instruction identifying a destination for the multimedia information; and sending the multimedia information from the standardization server to the playing terminal, wherein the playing terminal is configured to receive and play the multimedia information for the remote viewer.

In one or more example embodiments, a collecting device is part of a multimedia information live system that further comprises a standardization server, a live terminal, and a playing terminal. The example collecting device comprises: a receiver, configured to receive a live instruction sent from the live terminal, the live instruction identifying a destination for multimedia information; a processor, configured to record ambient information to obtain multimedia information having audiovisual information to be presented in real time to a remote viewer; a transmitter, configured to send the multimedia information to the standardization server based on the destination identified in the live instruction, wherein the standardization server is configured to send the multimedia information to the playing terminal, and wherein the playing terminal is configured to receive the multimedia information from the standardization server and play the multimedia information for the remote viewer.

In one or more example embodiments, a standardization server is part of a multimedia information live system that further comprises a collecting device, a live terminal, and a playing terminal. The example standardization server comprises: a processing component; a memory, configured to store instructions executable by the processing component. The processing component is configured to execute instructions stored in the memory to: receive multimedia information sent by the collecting device, wherein the multimedia information is sent by the collecting device according to a live instruction that identifies a destination for the multimedia information, wherein the multimedia information is obtained by the collecting device by recording ambient information, wherein the multimedia information includes audiovisual information to be presented in real time to a remote viewer, and wherein the live instruction is sent from the live terminal to the collecting device; send the multimedia information to the playing terminal, wherein the playing terminal is configured to receive the multimedia information and play the multimedia information for the remote viewer.

BRIEF DESCRIPTION OF THE DRAWINGS

In order to more clearly illustrate technical solutions of embodiments of the present disclosure, the drawings referenced in the below discussion of the embodiments are introduced briefly as follows. The drawings only depict some embodiments of the present disclosure and are presented to illustrate, without limitation, principles of example embodiments of the present disclosure.

The accompanying drawings, which are incorporated in and constitute a part of this specification, illustrate embodiments consistent with the present disclosure and, together with the description, serve to explain the principles of the present disclosure.

DETAILED DESCRIPTION

In order to make objectives, technical solutions and advantages of the present disclosure easier to appreciate, details of embodiments of the present disclosure will be illustrated with reference to accompany drawings. The illustrated embodiments may correspond to only parts but not all of the embodiments of the present disclosure. The scope of the present disclosure is not limited to the embodiments represented in the figures.

Figure 1:
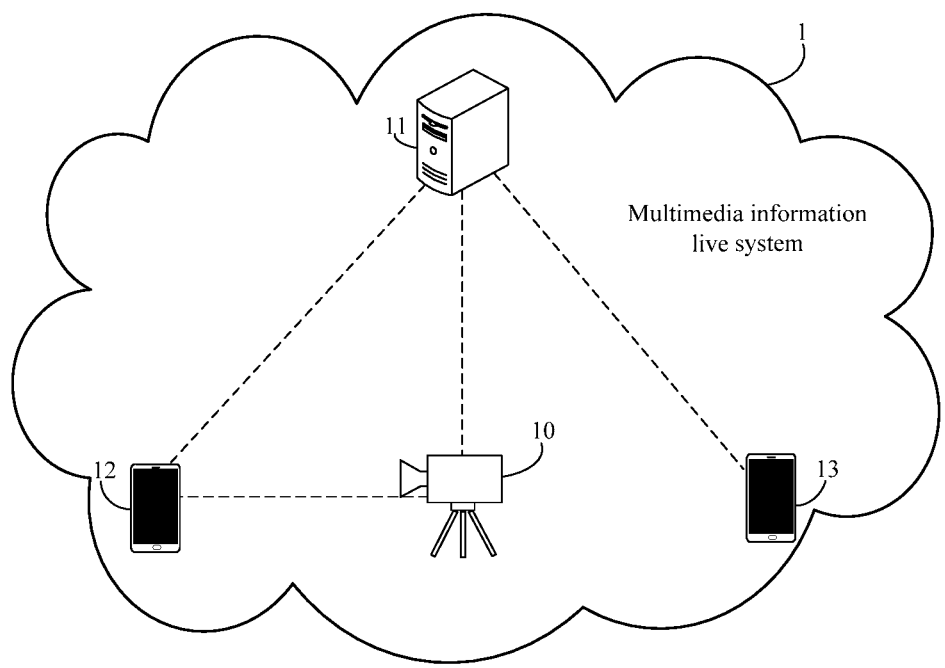
FIG. 1 is a schematic diagram illustrating a live multimedia information system according to one or more example embodiments of the present disclosure.

FIG. 1 is a schematic diagram illustrating a live multimedia information system according to an example embodiment. As shown in FIG. 1, the live multimedia information system 1 may include a collecting device 10, a standardization server 11, a live terminal 12 and a playing terminal 13. Both the live terminal 12 and the playing terminal 13 may log into the standardization server 11 and establish communication connections with the standardization server 11. The live terminal 12 may also establish a communication connection with the collecting device 10.

For example, the communication connections among the collecting device 10, the standardization server 11, the live terminal 12 and the playing terminal 13 may be established through wired networks and/or wireless networks. There are no limits on that in the present disclosure. Potential types of wired networks may include, without limitation, universal serial bus (USB) connections. Potential types of wireless networks may include, without limitation, Wireless Fidelity (WiFi), Bluetooth, infrared, ZigBee, etc. It should be noted that the live terminal of the present disclosure may be implemented using a mobile phone.

Figure 2:
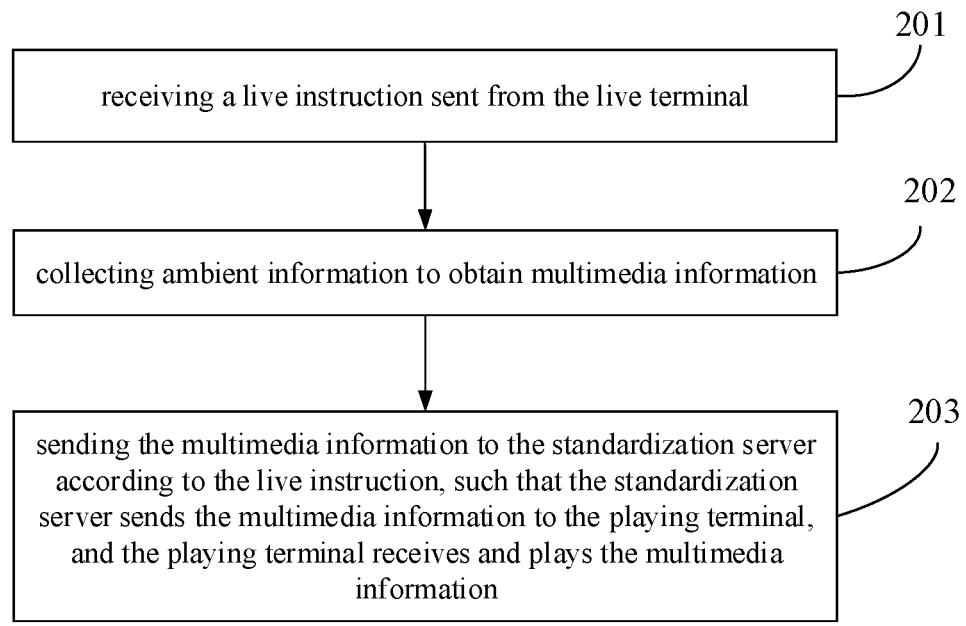
FIG. 2 is a flow chart illustrating a live multimedia information method according to one or more example embodiments of the present disclosure.

FIG. 2 is a flow chart illustrating a live multimedia information method according to an example embodiment. The live multimedia information method may be applied to the collecting device 10 of the multimedia information live system 1 shown in FIG. 1. As shown in FIG. 2, the live multimedia information method may include the following acts in example embodiments.

At block 201, a live instruction sent from a live terminal is received at a collecting device.

At block 202, ambient information is collected by the collecting device to obtain multimedia information (such as audiovisual material).

At block 203, the multimedia information is sent to the standardization server by the collecting device according to the live instruction, such that the standardization server may send the multimedia information to the playing terminal, and the playing terminal may receive and play the multimedia information.

In summary, with the live multimedia information method according to embodiments of the present disclosure, when the collecting device receives the live instruction sent from the live terminal, it may collect multimedia information and send the collected multimedia information to the standardization server, such that the standardization server may send the multimedia information to the playing terminal so as to be played. Since the collecting device and the live device are separate, quality of the multimedia information collected by the collecting device may be improved by improving configuration parameters of the collecting device. Here, the configuration parameters may include software parameters such as bit rate, image resolution, etc. and hardware parameters such as video memory, transmission rate, focal distance, etc. Thus quality of the multimedia information received by the playing terminal may be improved accordingly and playing effect (quality) of the multimedia information may be improved.

In certain implementations, the multimedia information collected by the collecting device may have a format of HDMI (high definition multimedia interface) or SDI (serial digital interface).

In certain implementations, block 203 may include sending the multimedia information to the standardization server based on RTMP (real time messaging protocol).

In certain implementations, the live instruction carries a first network address, and the first network address belongs to at least one network address of the standardization server.

Figure 3:
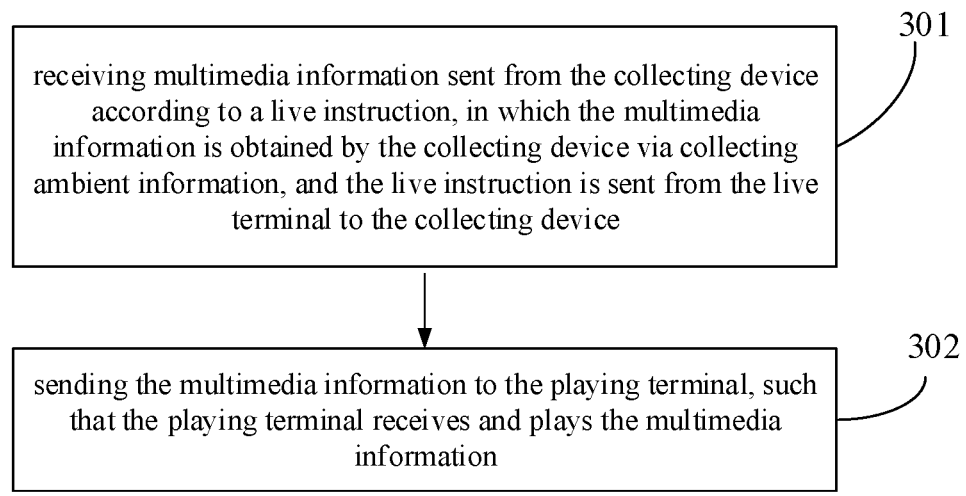
FIG. 3 is a flow chart illustrating another live multimedia information method according to one or more example embodiments of the present disclosure.

FIG. 3 is a flow chart illustrating another live multimedia information method according to an example embodiment. The live multimedia information method may be applied to the standardization server 11 of the live multimedia information system 1 shown in FIG. 1. As shown in FIG. 3, the multimedia information method may include following acts in example embodiments.

At block 301, multimedia information sent by the collecting device according to a live instruction is received at the standardization server. The multimedia information is obtained by the collecting device by collecting ambient information (such as by recording sounds and images), and the live instruction is sent by the live terminal to the collecting device to instruct the collecting device on collecting ambient information.

At block 302, the multimedia information is sent to the playing terminal, such that the playing terminal receives and plays the multimedia information.

In summary, with the live multimedia information method according to embodiments of the present disclosure, when the standardization server receives the multimedia information, which is obtained via collection of ambient information and sent by the collecting device according to the live instruction, the standardization server may send the multimedia information to the playing terminal so as to be played. Since the collecting device and the live device are separate, quality of the multimedia information collected by the collecting device may be improved by improving configuration parameters of the collecting device. Thus quality of the multimedia information received by the playing terminal may be improved accordingly and playing quality of the multimedia information may be improved.

In certain implementations, the multimedia information collected by the collecting device may have a format of HDMI (high definition multimedia interface) or SDI (serial digital interface).

In certain implementations, block 301 may include receiving the multimedia information sent from the collecting device according to the first network address based on RTMP.

In certain implementations, the standardization server has at least two network addresses, and the live multimedia information method may further include: receiving a live request sent from the live terminal; selecting a first network address and a second network address from the at least two network addresses of the standardization server, in which the first network address and the second network address may indicate different storage modules (e.g., one or more storage media or portions thereof) of the standardization server; sending the first network address to the live terminal, such that the live terminal may send the live instruction carrying the first network address to the collecting device.

In certain implementations, the live multimedia information method may further include: saving the multimedia information into a storage module corresponding with the first network address; standardizing the multimedia information to make parameters of standardized multimedia information in accordance with live broadcast parameters of the playing terminal; saving the standardized multimedia information into a storage module indicated by (corresponding with) the second network address; and receiving a playing request/play request with the second network address (corresponding with the live broadcast parameters for the playing terminal) from the playing terminal. Here, the live broadcast parameters may include software parameters related to the media player.

And the above block 302 may include: obtaining the standardized multimedia information from the storage module indicated by the second network address; sending the standardized multimedia information to the playing terminal by, for example, a live delivery mechanism and a content delivery network (CDN) mechanism.

Figure 4:
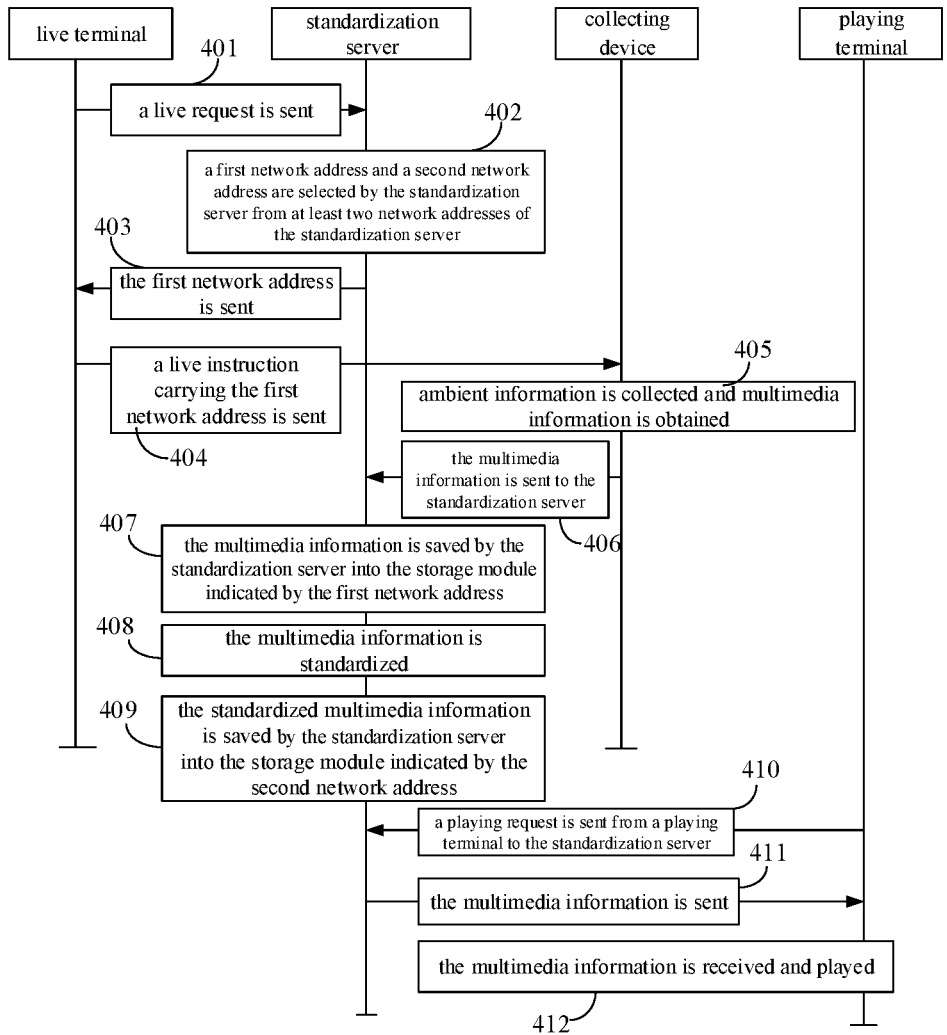
FIG. 4 is a flow chart illustrating yet another live multimedia information method according to one or more example embodiments of the present disclosure.

FIG. 4 is a flow chart illustrating yet another live multimedia information method according to an example embodiment. The live multimedia information method may be applied to the live multimedia information system 1 shown in FIG. 1. As shown in FIG. 4, the live multimedia information method may include following acts in example embodiments.

At block 401, a live request is sent from the live terminal to the standardization server.

For example, an "anchor" (e.g., a provider of live multimedia information, such as an entertainment, educational, or news program) may log into the standardization server through the live terminal, and a communication connection between the live terminal and the standardization server may be established after the anchor has successfully logged into the standardization server. An example user interface of the live terminal 12 may be illustrated as in FIG. 5A. An "I want live" button may be displayed on the user interface of the live terminal 12. When the user wants to perform live (i.e., provide multimedia information live or in real time/near real time), he/she may select the "I want live" button so as to trigger the live terminal to send the live request to the standardization server.

Figure 5A:
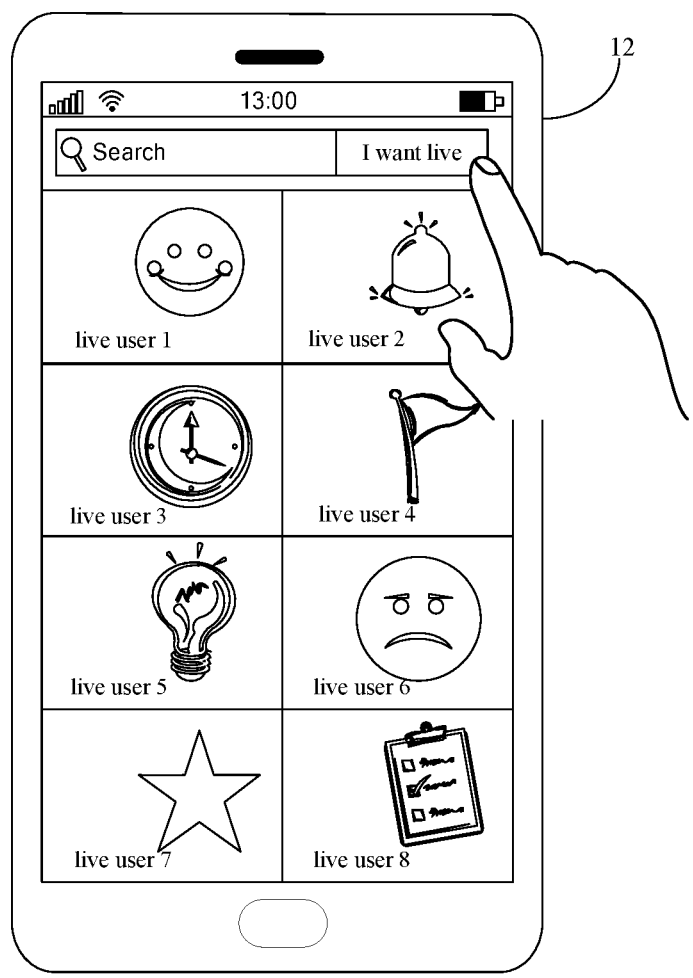
FIG. 5A is a schematic diagram illustrating a user interface according to one or more example embodiments of the present disclosure.

Furthermore, for users currently "on" live (i.e., currently providing live multimedia information), live images (e.g., a picture or video) relating to the users may be displayed on the user interface of the live terminal 12. For example, the user interface illustrated in FIG. 5A shows 8 users currently on live and an image relating to each of the eight users. A search box may also be displayed on the user interface of the live terminal 12. When the user wants to watch a live presentation/feed of another user, the search box may be clicked and an identifier of the other user (e.g., a user name) may be input in the search box, and then the live presentations/feeds of other users matching the search criteria may be displayed on the live terminal for selection.

At block 402, a first network address and a second network address are selected by the standardization server from at least two network addresses of the standardization server.

For example, a plurality of (at least two) storage modules may be provided in the standardization server and each storage module has a network address. The at least two network addresses of the standardization server may be the network addresses of the at least two storage modules. When the standardization server receives the live request from the live terminal, the first network address and the second network address may be selected from among the at least two network addresses of the standardization server, and the first network address and the second network address may indicate different storage modules of the standardization server. In certain implementations, the preset method may be a random selection method or other selection methods, and there are no limits on that in the present disclosure.

At block 403, the first network address is sent from the standardization server to the live terminal.

When the first network address and the second network address are selected by the standardization server, the first network address may be sent to the live terminal directly. For example, the standardization server may generate a message including the first network address and send the message including the first network address to the live terminal according to a certain communication protocol.

At block 404, a live instruction carrying the first network address may be sent from the live terminal to the collecting device.

When the live terminal receives a message with the first network address sent by the standardization server, the live terminal may generate the live instruction carrying the first network address according to the message, and send the live instruction carrying the first network address to the collecting device. In certain implementations, when the live terminal receives the message including the first network address sent by the standardization server, the live terminal may directly process the message including the first network address (for example, to add a message header or message trailer) and then send the processed message to the collecting device.

At block 405, ambient information is collected by the collecting device (i.e., information corresponding to the surroundings of the collecting device) to obtain multimedia information.

For example, the collecting device may include a collecting module. At block 405, the collecting device may collect the ambient information via the collecting module so as to obtain the multimedia information. The collecting module in embodiments of the present disclosure may be a professional photograph/video module and the multimedia information collected by the collecting module may have a format of HDMI (high definition multimedia interface) or SDI (serial digital interface).

The collecting module may further include at least one collecting unit and one directing unit. Each collecting unit may include a video collecting sub-unit and an audio collecting sub-unit. The video collecting sub-unit is configured to collect video information and the audio collecting sub-unit is configured to collect audio information. Multimedia information collected by the collecting unit may include the video information collected by the video collecting sub-unit and the audio information collected by the audio collecting sub-unit. Each of the at least one collecting unit is connected to the one directing unit, and the multimedia information collected by each of the collecting units is sent to the directing unit. The directing unit may select one piece of multimedia information from at least one piece of multimedia information sent from the at least one collecting unit as the multimedia information collected by the collecting module.

At block 406, the multimedia information is sent to the standardization server by the collecting device according to the live instruction.

In certain implementations, the collecting device may further include an encoding module and a sending module. The collecting module, the encoding module and the sending module of the collecting device are communicatively coupled to each other. At block 405, when the multimedia information is obtained by the collecting device via the collecting module, the multimedia information may be sent directly from the collecting module to the encoding module.

When the encoding module receives the multimedia information, the multimedia information may be encoded directly. For example, the multimedia information may include video information and audio information, in which, the encoded video information may be with a new generation of digital video compression format (e.g., H.264), and the encoded audio information may be with a format of, for example, ACC (Advanced Audio Coding).

When the multimedia information has been encoded, the encoded multimedia information may be sent to the sending module by the encoding module. For example, the sending module may be a module that can transmit information based on, for example, RTMP (real time messaging protocol). When the sending module receives the encoded multimedia information, the encoded multimedia information may be sent to the standardization server according to the first network address based on RTMP. In certain implementations, the sending module may send the encoded multimedia information to a storage module indicated/identified by (corresponding to) the first network address of the standardization server. It should be noted that the standardization server may also receive the encoded multimedia information sent by the sending module based on RTMP.

At block 407, the multimedia information is saved by the standardization server into the storage module indicated by the first network address.

In certain implementations, the encoded multimedia information sent to the standardization server by the sending module at block 406 may further include the first network address. When the standardization server receives the encoded multimedia information sent by the collecting device via the sending module, the encoded multimedia information may be directly saved (cached) into the storage module indicated by the first network address.

At block 408, the multimedia information is standardized by the standardization server.

When the standardization server saves the encoded multimedia information, the encoded multimedia information may be processed such that the processed multimedia information can be better played by the playing terminal.

For example, the standardization server may decode the encoded multimedia information first and obtain decoded multimedia information. Then, the standardization server may standardize the decoded multimedia information to make parameters of standardized multimedia information in accordance with live broadcast parameters (e.g., resolution and frequency) of the playing terminal. This allows the multimedia information to have parameters better suited for enhanced playback by the playing terminal, so that, for example, videos need not be "choppy."

Since the collecting device in embodiments of the present disclosure is a professional collecting device, video information collected by the professional collecting device may be with a relatively higher resolution, and the frequency of the video (e.g., frame rate) and audio information may also be relatively higher. While video information played by the playing terminal (for example, a mobile phone) may have a relatively lower resolution, and the frequency of the video and audio information may also be relatively lower. When the multimedia information is standardized by the standardization server, the resolution and the frequency of the multimedia information may be adjusted such that the parameters of the standardized multimedia information may be in a range corresponding to the playing parameters of the playing terminal, and the standardized multimedia information can be played on the playing terminal. In example embodiments, this allows the multimedia information to be captured using higher-quality collecting devices, but then optimized or otherwise modified/adjusted to enhance playback by the particular playing terminal(s) that will be used to play the multimedia information. This approach is an improvement at least because: (1) the multimedia information can be generated using collecting devices that are capable of recording higher-quality multimedia information relative to the live terminals; (2) the multimedia information can be better optimized for one or more playing terminals; and (3) "downsizing" or otherwise adjusting higher-quality multimedia information (e.g., multimedia information that is more faithful to reality or otherwise includes better ambient data) can generally yield better results for playback than downsizing lower-quality multimedia information, because, for example, there may be more data to manipulate.

At block 409, the standardized multimedia information is saved by the standardization server into the storage module indicated by the second network address.

When the multimedia information has been standardized by the standardization server, the standardized multimedia information may be saved into the storage module indicated by the second network address, in which the second network address is selected in advance.

It should be noted that, the standardized multimedia information may just be cached into the storage module indicated by the second network address. When the standardized multimedia information have been cached on the storage module indicated by the second network address for a preset duration, the standardization server may delete the standardized multimedia information in the storage module indicated by the second network address, or send the multimedia information to other server(s).

In certain implementations, at block 402, when the first network address and second network address are selected by the standardization server, correspondence among the live user (the user logged in at the live terminal), the first network address and the second network address may be established. In certain implementations, when the standardization server receives the multimedia information sent by the collecting device, the standardization server may expand the previously established correspondence and obtain correspondence among the live user, the first network addresses, the second network addresses and the collecting device.

For example, the correspondence among the live user, the first network addresses, the second network addresses and the collecting device obtained by the standardization server may be illustrated as table 1. For example, a live user M, a first network address X1, a second network address Y1 and a collecting device W1 are corresponded with each other. This indicates that when the live user M logs into the standardization server, the standardization server may allocate the first network address X1 and the second network address Y1 to the live user M and send the first network address X1 to a live terminal used by the live user M. The live terminal used by the live user M may directly send the first network address X1 to the collecting device W1. When multimedia information is collected by the collecting device W1, the multimedia information is sent to a storage module of the standardization server indicated by the first network address X1. Then the multimedia information in the storage module indicated by the first network address X1 is standardized by the standardization server, and then standardized multimedia information is stored in a storage module indicated by the second network address Y1.

TABLE 1

| live user | first network address | second network address | collecting device |
|---|---|---|---|
| M | X1 | Y1 | W1 |

At block 410, a playing request is sent from the playing terminal to the standardization server.

Figure 5B:
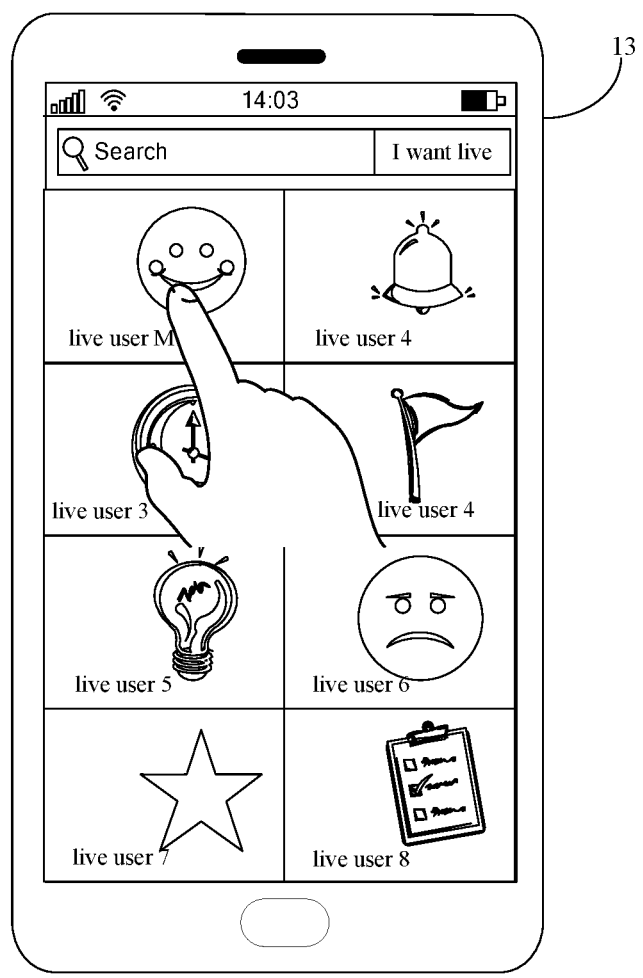
FIG. 5B is a schematic diagram illustrating another user interface according to one or more example embodiments of the present disclosure.

The audience (e.g., one or more receivers/consumers of the multimedia information) may also log into the standardization server through the playing terminal, and a communication connection between the playing terminal and the standardization server may be established after the audience has successfully logged into the standardization server. A user interface of the playing terminal 13 is illustrated as FIG. 5B. When the anchor (the live user) according to embodiments of the present disclosure is the live user M, the audience may directly click the area which represents the live user M and is located on the user interface. When the area representing the live user M is clicked by the audience, the playing terminal is triggered to generate the playing request carrying the second network address and send the playing request to the standardization server.

At block 411, the multimedia information is sent from the standardization server to the playing terminal.

For example, when the standardization server receives the playing request sent from the playing terminal, the standardization server may extract the second network address from the playing request, obtain the standardized multimedia information from the storage module indicated by the second network address, and then send the standardized multimedia information cached in the storage module indicated by the second network address to the playing terminal in real time.

In certain implementations, when playing requests carrying the second network address from a plurality of playing terminals are received by the standardization server at the same time, the standardization server may send the standardized multimedia information to the plurality of playing terminals based on a live delivery mechanism and CDN (content delivery network) mechanism.

At block 412, the multimedia information is received and played by the playing terminal.

Figure 5C:
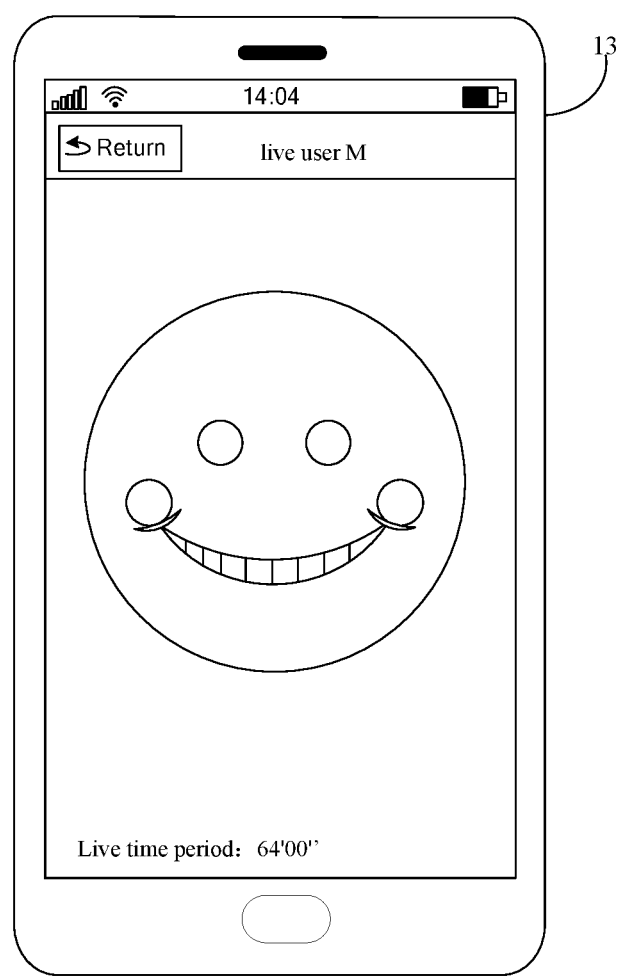
FIG. 5C is a schematic diagram illustrating yet another user interface according to one or more example embodiments of the present disclosure.

When the playing terminal receives the multimedia information, the multimedia information may be played. For example, at this time, a user interface of the playing terminal 13 may be illustrated by FIG. 5C. Currently, the anchor is the live user M, a total live time period of the live user M may also be displayed on the user interface. For example, if the live user M begins to perform live at 13:00, when the audience uses the playing terminal to play multimedia information provided by the live user M at 14:04, the total live 64'00" time period (i.e., 64 minutes and zero seconds) that the live user M has performed may be displayed on the user interface of the playing terminal of the audience.

In summary, with the live multimedia information method, when the collecting device receives the live instruction sent from the live terminal, the collecting device may send the collected multimedia information to the standardization server, such that the standardization server may send the multimedia information to the playing terminal so as to be played. Since the collecting device and the live device are separate, quality of the multimedia information collected by the collecting device may be improved by improving configuration parameters of the collecting device. Thus quality of the multimedia information received by the playing terminal may be improved accordingly and playing effect of the multimedia information may be improved.

It should be noted that the order of the steps or blocks of the live multimedia information method provided in embodiments of the present disclosure may be adjusted and addition or reduction of the steps or blocks may be performed according to different practices. Any changes or alternatives within the technical scope of the present disclosure that can be easily made by those skilled in the art should fall in the scope of the present disclosure, and not all possible changes and alternatives are detailed here.

Figure 6:
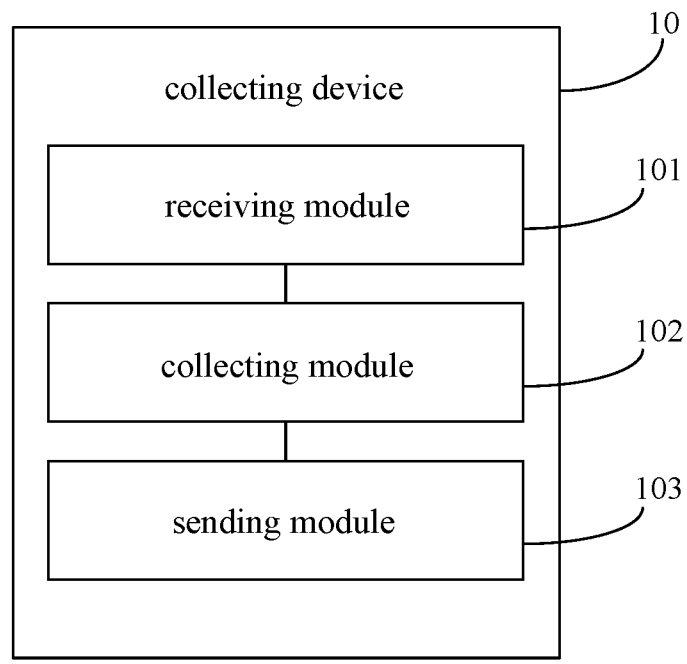
FIG. 6 is a schematic diagram illustrating a collecting device according to one or more example embodiments of the present disclosure.

FIG. 6 is a schematic diagram illustrating a collecting device 10 according to one or more example embodiments. The collecting device 10 may be included in the live multimedia information system 1 shown in FIG. 1. The collecting device 10 includes a receiving module 101, a collecting module 102, and a sending module 103.

The receiving module 101 is configured to receive a live instruction sent from a live terminal.

The collecting module 102 is configured to collect ambient information so as to obtain multimedia information.

The sending module 103 is configured to send the multimedia information to the standardization server according to the live instruction, such that the standardization server may send the multimedia information to the playing terminal, and the playing terminal receives and plays the multimedia information.

In summary, with the collecting device according to embodiments of the present disclosure, when the live instruction sent from the live terminal is received by the receiving module, the collecting module may collect the multimedia information according to the live instruction, and the collected multimedia information may be sent from the sending module to the standardization server such that the multimedia information may be further sent from the standardization server to the playing terminal and finally be played. Since the collecting device and the live device are separate, quality of the multimedia information collected by the collecting device may be improved by improving configuration parameters of the collecting device. Thus quality of the multimedia information received by the playing terminal may be improved accordingly and playing effect of the multimedia information may be improved.

In certain implementations, the multimedia information collected by the collecting device may have a format of HDMI or SDI.

In certain implementations, the sending module 103 may be further configured to send the multimedia information to the standardization server based on RTMP.

In certain implementations, the live instruction carries a first network address, and the first network address belongs to at least one network address of the standardization server.

Figure 7A:
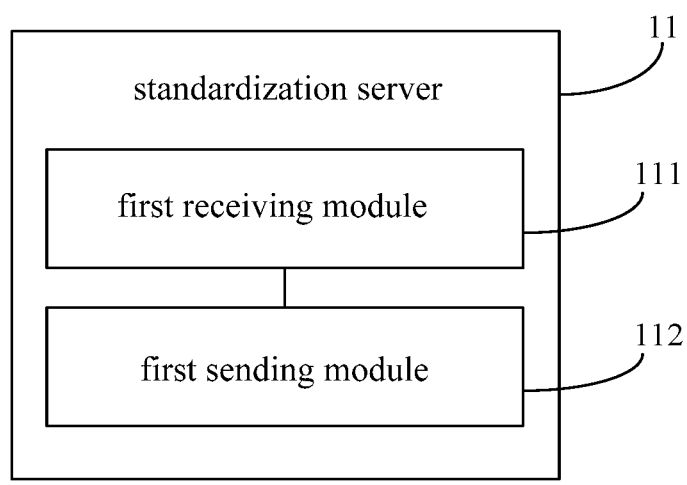
FIG. 7A is a schematic diagram illustrating a standardization server according to one or more example embodiments of the present disclosure.

FIG. 7A is a schematic diagram illustrating a standardization server 11 according to an example embodiment. The standardization server 11 may be included in the live multimedia information system 1 shown in FIG. 1. The standardization server 11 includes a first receiving module 111 and a first sending module 112.

The first receiving module 111 is configured to receive multimedia information sent from the collecting device according to a live instruction, in which the multimedia information is obtained by the collecting device via collecting ambient information, and the live instruction is sent from the live terminal to the collecting device.

The first sending module 112 is configured to send the multimedia information to the playing terminal, such that the playing terminal receives and plays the multimedia information.

In summary, with the standardization server according to embodiments of the present disclosure, when the first receiving module receives the multimedia information which is obtained via collecting ambient information and sent by the collecting device according to the live instruction, the multimedia information may be further sent from the first sending module to the playing terminal and finally be played. Since the collecting device and the live device are separate, quality of the multimedia information collected by the collecting device may be improved by improving configuration parameters of the collecting device. Thus quality of the multimedia information received by the playing terminal may be improved accordingly and playing effect of the multimedia information may be improved.

In certain implementations, the multimedia information collected by the collecting device may have a format of HDMI or SDI.

In certain implementations, the first receiving module may be further configured to receive the multimedia information sent from the collecting device according to the live instruction based on RTMP.

Figure 7B:
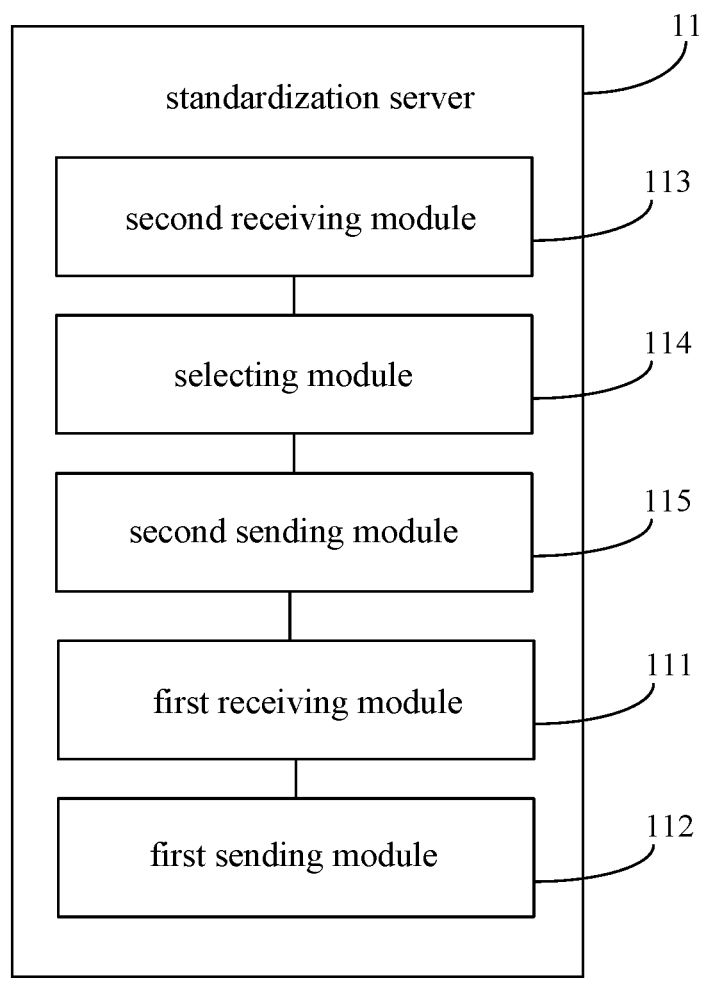
FIG. 7B is a schematic diagram illustrating another standardization server according to one or more example embodiments of the present disclosure.

FIG. 7B is a schematic diagram illustrating another standardization server 11 according to one or more example embodiments. The standardization server 11 may have at least two network addresses. On the basis of FIG. 7A, the standardization server 11 may further include a second receiving module 113, a selecting module 114 and a second sending module 115.

The second receiving module 113 is configured to receive a live request sent from the live terminal.

The selecting module 114 is configured to select a first network address and a second network address from the at least two network addresses of the standardization server, in which the first network address and the second network address may indicate different storage modules of the standardization server.

The second sending module 115 is configured to send the first network address to the live terminal, such that the live terminal may send the live instruction carrying the first network address to the collecting device.

Figure 7C:
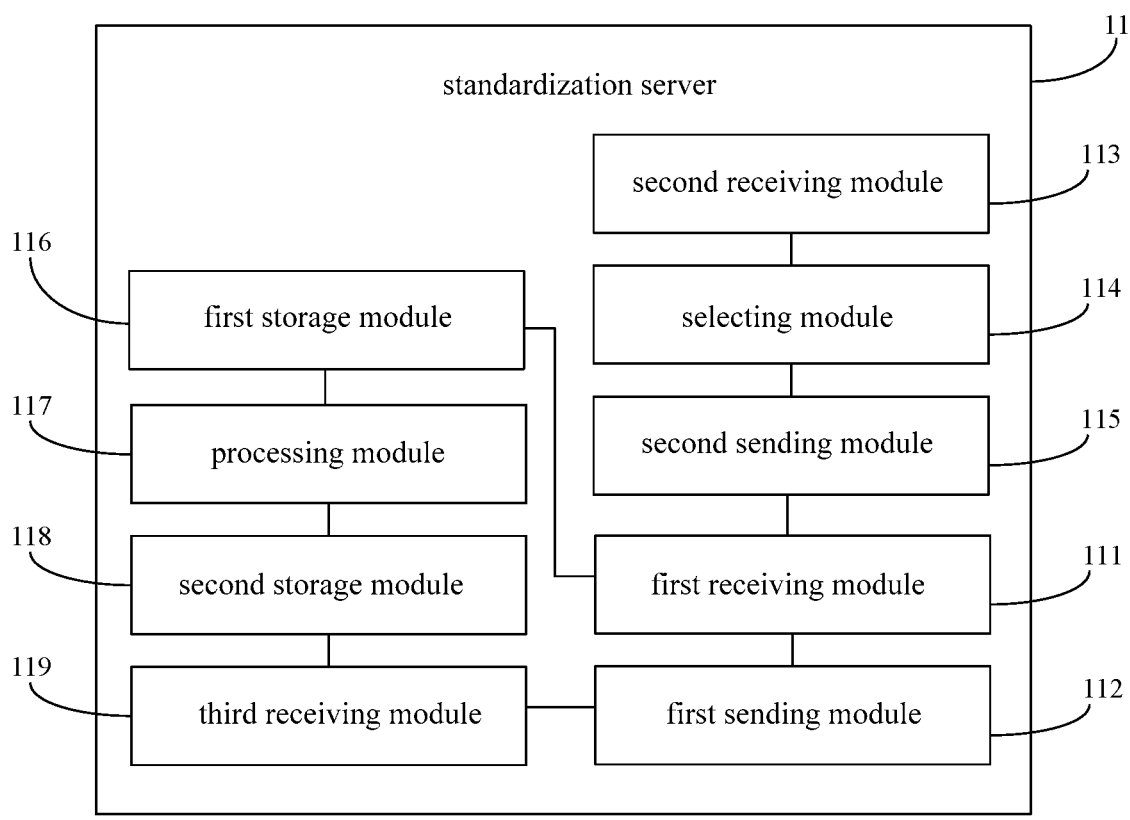
FIG. 7C is a schematic diagram illustrating yet another standardization server according to one or more example embodiments of the present disclosure.

FIG. 7C is a schematic diagram illustrating yet another standardization server 11 according to one or more example embodiments. On the basis of FIG. 7B, the standardization server 11 may further include a first storage module 116, a processing module 117, a second storage module 118, and a third receiving module 119.

The first storage module 116 is configured to save the multimedia information into a storage module indicated by the first network address.

The processing module 117 is configured to standardize the multimedia information to make parameters of standardized multimedia information in accordance with live broadcast parameters (e.g., parameters intended to enhance live playback, such as encoding format, resolution, frame rate, etc.) of the playing terminal.

The second storage module 118 is configured to save the standardized multimedia information into a storage module indicated by the second network address.

The third receiving module 119 is configured to receive a playing request carrying the second network address from the playing terminal.

The first sending module 112 may further be configured to obtain the standardized multimedia information from the storage module indicated by the second network address and send the standardized multimedia information to the playing terminal by a live delivery mechanism and a CDN mechanism.

In summary, with the standardization server according to embodiments of the present disclosure, when the first receiving module receives the multimedia information which is obtained via collecting ambient information and sent by the collecting device according to the live instruction, the multimedia information may be further sent from the first sending module to the playing terminal and finally be played. Since the collecting device and the live device are separate, quality of the multimedia information collected by the collecting device may be improved by improving configuration parameters of the collecting device. Thus quality of the multimedia information received by the playing terminal may be improved accordingly and playing effect of the multimedia information may be improved.

Figure 8:
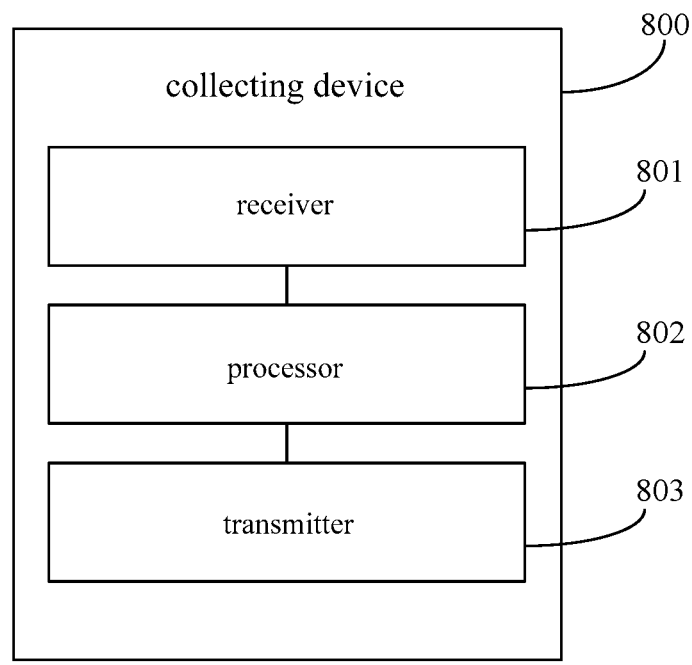
FIG. 8 is a schematic diagram illustrating another collecting device according to one or more example embodiments of the present disclosure.

FIG. 8 is a schematic diagram illustrating another collecting device 800 according to an example embodiment. The collecting device 800 may be achieved as the collecting device 10 of the live multimedia information system 1 shown in FIG. 1. The collecting device 800 includes a receiver 801, a processor 802 and a transmitter 803.

The receiver 801 is configured to receive a live instruction sent from a live terminal.

The processor 802 is configured to collect (e.g., record) ambient information to obtain multimedia information (e.g., generate one or more multimedia computer files that could be replayed).

The transmitter 803 is configured to send the multimedia information (e.g., multimedia computer files) to the standardization server according to the live instruction, such that the standardization server may send the multimedia information to the playing terminal, and the playing terminal receives and plays the multimedia information.

In summary, with the collecting device according to embodiments of the present disclosure, when the live instruction sent from the live terminal is received by the receiver, the processor may collect the multimedia information according to the live instruction, and the collected multimedia information may be sent from the transmitter to the standardization server such that the multimedia information may be further sent from the standardization server to the playing terminal and finally be played. Since the collecting device and the live device are separate, quality of the multimedia information collected by the collecting device may be improved by improving configuration parameters of the collecting device. Thus quality of the multimedia information received by the playing terminal may be improved accordingly and playing effect of the multimedia information may be improved.

In certain implementations, the multimedia information collected by the collecting device may have a format of HDMI or SDI.

In certain implementations, the transmitter 803 may be further configured to send the multimedia information to the standardization server based on RTMP.

In certain implementations, the live instruction carries a first network address, and the first network address belongs to at least one network address of the standardization server.

Figure 9:
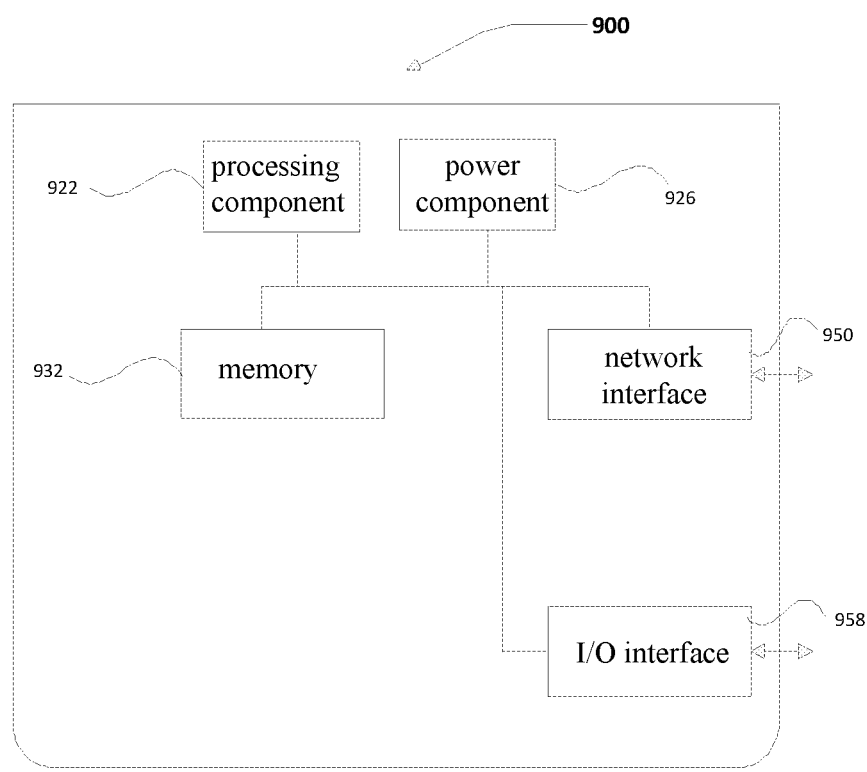
FIG. 9 is a schematic diagram illustrating still another standardization server according to one or more example embodiments of the present disclosure.

FIG. 9 is a schematic diagram illustrating still another standardization server 900 according to one or more example embodiments. The standardization server 900 may be achieved as the standardization server 11 of the live multimedia information system 1 shown in FIG. 1. Referring to FIG. 9, the standardization server 900 includes a processing component 922 and storage means such as a memory 932. The processing component 922 may further include one or more processors. The storage means may be configured to store instructions that can be executed by the processing component 922, for example an application program. The application program stored in the memory 932 may include one or more modules, each of which may correspond to a set of instructions. Moreover, the processing component 922 is configured to execute the instructions so as to perform the live multimedia information method illustrated in FIG. 3.

The standardization server 900 may further include a power component 926 configured to manage power source of the standardization server 900; a wire or wireless network interface 950 configured to connect the standardization server 900 to a network; and an input/output (I/O) interface 958. The standardization server 900 may be operated based on an operation system stored in the memory 932, for example Windows Server™, Mac OS X™, Unix™, Linux™, FreeBSD™ or the like.

In summary, with the standardization server according to embodiments of the present disclosure, when the standardization server receives the multimedia information which is obtained via collecting ambient information and sent by the collecting device according to the live instruction, the multimedia information may be further sent from the standardization server to the playing terminal and finally be played. Since the collecting device and the live device are separate, quality of the multimedia information collected by the collecting device may be improved by improving configuration parameters of the collecting device. Thus quality of the multimedia information received by the playing terminal may be improved accordingly and playing effect of the multimedia information may be improved. In certain implementations, the multimedia information collected by the collecting device may have a format of HDMI (high definition multimedia interface) or SDI (serial digital interface).

Those skilled in the art should understand that, the above illustrated embodiments of the live multimedia information method, the collecting device and the standardization server may be referenced with each other, thus some embodiments may be omitted for concision and clarity.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the present disclosure will be apparent to those skilled in the art from consideration of the specification and practice of the present disclosure. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method, implemented using a collecting device, for presentation of live multimedia information, the collecting device being part of a live multimedia information system comprising a standardization server, a live terminal, a playing terminal, and the collecting device, wherein the collecting device is configured to send multimedia information to the standardization server, and wherein the standardization server is configured to receive multimedia information from the collecting device and send multimedia information to the playing terminal, the method comprising:
   receiving, at the collecting device, a live instruction sent by the live terminal, the live instruction identifying a destination for multimedia information, wherein the destination is identified in the live instruction for the multimedia information using a first network address that is allocated to the live terminal by the standardization server, and the multimedia information is standardized and is stored in a second network address wherein the first network address and the second network address correspond to the live terminal and the collecting device;
   recording, via the collecting device, ambient information to obtain multimedia information having audiovisual information to be presented to a remote viewer; and
   based on the destination identified in the live instruction, sending the multimedia information from the collecting device to a storage module indicated by the first network address of the standardization server for transmission to the playing terminal, the playing terminal being configured to receive the multimedia information from the standardization server and play the multimedia information for the remote viewer.

2. The method according to claim 1, wherein the multimedia information obtained by the collecting device has a format of high definition multimedia interface (HDMI) or serial digital interface (SDI).

3. The method according to claim 1, wherein sending the multimedia information to the standardization server comprises:
   sending the multimedia information to the standardization server based on real time messaging protocol (RTMP).

4. The method according to claim 1, wherein the first network address belongs to at least one network address of the standardization server.

5. A method, implemented using a standardization server, for presentation of live multimedia information, the standardization server being part of a live multimedia information system comprising a collecting device, a live terminal, a playing terminal, and the standardization server, wherein the collecting device is configured to send multimedia information to the standardization server, and wherein the standardization server is configured to receive multimedia information from the collecting device and send multimedia information to the playing terminal, the method comprising:
   allocating a first network address and a second network address to the live terminal from at least two network addresses of the standardization server, and sending the first network address to the live terminal, wherein the first network address and the second network address correspond to the live terminal and the collecting device, and the live terminal sends the first network address to the collecting device;
   receiving, at the standardization server, multimedia information sent by the collecting device, wherein the multimedia information is obtained by the collecting device by recording ambient information, the multimedia information having audiovisual information to be presented to a remote viewer, and wherein the collecting device sends the multimedia information according to a live instruction received from the live terminal, the live instruction identifying a destination for the multimedia information, the destination being a first network address allocated to the live terminal by the standardization server;
   standardizing the multimedia information and caching standardized multimedia information in a storage module indicated by the second network address; and
   sending the standardized multimedia information from the standardization server to the playing terminal, wherein the playing terminal is configured to receive and play the multimedia information for the remote viewer, and deleting the standardized multimedia information in the storage module indicated by the second network address.

6. The method according to claim 5, wherein the multimedia information obtained by the collecting device has a format of high definition multimedia interface (HDMI) or serial digital interface (SDI).

7. The method according to claim 5, wherein receiving multimedia information sent by the collecting device comprises:
   receiving multimedia information sent by the collecting device based on real time messaging protocol (RTMP).

8. The method according to claim 5, wherein the first network address and the second network address are allocated in response to
   receiving, at the standardization server, a live request sent by the live terminal; and
   the first network address and the second network address indicate different storage modules of the standardization server.

9. The method according to claim 8, wherein standardizing the multimedia information comprises:
   standardizing the multimedia information to generate standardized multimedia information having live broadcast parameters for the playing terminal;
   receiving, from the playing terminal, a playing request carrying the second network address;
   wherein sending the standardized multimedia information from the standardization server to the playing terminal comprises:
   retrieving the standardized multimedia information from the storage module corresponding to the second network address; and
   sending the standardized multimedia information to the playing terminal via a live delivery mechanism and a content delivery network (CDN) mechanism.

10. A collecting device, included in a multimedia information live system, wherein the multimedia information live system further comprises a standardization server, a live terminal, and a playing terminal, and the collecting device comprises:
- a receiver, configured to receive a live instruction sent from the live terminal, the live instruction identifying a destination for multimedia information, wherein the destination is identified in the live instruction for the multimedia information using a first network address that is allocated to the live terminal by the standardization server, and the multimedia information is standardized and is stored in a second network address wherein the first network address and the second network address correspond to the live terminal and the collecting device;
- a processor, configured to record ambient information to obtain multimedia information having audiovisual information to be presented in real time to a remote viewer;
- a transmitter, configured to send the multimedia information to a storage module indicated by the first network address of the standardization server based on the destination identified in the live instruction, wherein the standardization server is configured to send the multimedia information to the playing terminal, and wherein the playing terminal is configured to receive the multimedia information from the standardization server and play the multimedia information for the remote viewer.

11. The collecting device according to claim 10, wherein the multimedia information obtained by the collecting device has a format of high definition multimedia interface (HDMI) or serial digital interface (SDI).

12. The collecting device according to claim 10, wherein the transmitter is further configured to send the multimedia information to the standardization server based on real time messaging protocol (RTMP).

13. The method according to claim 10, wherein the first network address belongs to at least one network address of the standardization server.

14. A standardization server, included in a multimedia information live system, wherein the multimedia information live system further comprises a collecting device, a live terminal, and a playing terminal, and the standardization server comprises:
- a processing component;
- a memory, configured to store instructions executable by the processing component;
- wherein the processing component is configured to execute instructions stored in the memory to:
- allocate a first network address and a second network address to the live terminal from at least two network addresses of the standardization server, and sending the first network address to the live terminal, wherein the first network address and the second network address correspond to the live terminal and the collecting device, and the live terminal sends the first network address to the collecting device;
- receive multimedia information sent by the collecting device, wherein the multimedia information is sent by the collecting device according to a live instruction that identifies a destination for the multimedia information, wherein the multimedia information is obtained by the collecting device by recording ambient information, wherein the multimedia information includes audiovisual information to be presented in real time to a remote viewer, and wherein the live instruction is sent from the live terminal to the collecting device, the destination being a first network address allocated to the live terminal by the standardization server;
- standardize the multimedia information and caching standardized multimedia information in a storage module indicated by the second network address; and
- send the standardized multimedia information to the playing terminal, wherein the playing terminal is configured to receive the multimedia information and play the multimedia information for the remote viewer, and delete the standardized multimedia information in the storage module indicated by the second network address.

15. The standardization server according to claim 14, wherein the multimedia information obtained by the collecting device has a format of high definition multimedia interface (HDMI) or serial digital interface (SDI).

16. The standardization server according to claim 14, wherein the processing component is further configured to execute instructions stored in the memory to receive the multimedia information sent by the collecting device according to the live instruction based on real time messaging protocol (RTMP).

17. The standardization server according to claim 14, wherein the first network address and the second network address are allocated in response to:
- receiving, at the standardization server, a live request sent from the live terminal; and
- the first network address and the second network address indicate different storage modules of the standardization server.

18. The standardization server according to claim 17, wherein the processing component is configured execute instructions stored in the memory to:
- standardize the multimedia information to generate standardized multimedia information having live broadcast parameters for the playing terminal; and
- receive, from the playing terminal, a playing request carrying the second network address;
- wherein the processing component is further configured to send the standardized multimedia information from the standardization server to the playing terminal by:
- retrieving the standardized multimedia information from the storage module corresponding to the second network address;
- sending the standardized multimedia information to the playing terminal via a live delivery mechanism and a content delivery network (CDN) mechanism.

* * * * *